Sept. 4, 1962 G. J. SAXENMEYER 3,052,406

DATA CLASSIFYING DEVICE

Filed Dec. 17, 1958 2 Sheets-Sheet 1

INVENTOR
GEORGE J. SAXENMEYER
BY William N. Barret Jr.
ATTORNEY

Sept. 4, 1962 G. J. SAXENMEYER 3,052,406

DATA CLASSIFYING DEVICE

Filed Dec. 17, 1958 2 Sheets-Sheet 2

United States Patent Office 3,052,406
Patented Sept. 4, 1962

3,052,406
DATA CLASSIFYING DEVICE

George J. Saxenmeyer, Vestal, N.Y., assignor to International Business Machines Corporation, New York, N.Y., a corporation of New York
Filed Dec. 17, 1958, Ser. No. 781,003
4 Claims. (Cl. 235—61.11)

The present invention relates to an apparatus for reading data coded according to row position by row and classifying the data for translation into a different code. In particular, the present invention relates to a punched card reading apparatus for classifying data in the card for translation into a particular code for use on a rotating magnetic drum.

In conventional record cards, information is stored in the columns of the cards as punched holes in selected rows. The rows of a card are numbered 12, 11, 0 and 1–9. Each numeric character is represented by a hole punched in a single row 0–9 for the particular decimal denomination. An alphabetic character is represented by two holes; one hole being contained in the zone rows 12, 11 or 0 and one hole in numeric row 1–9. Special characters are represented by three punches, two punches or one punch which do not occur in the alphabetic or numeric scheme. In the numeric system of coding, a punch must be made in one of rows 0–9 in order to become a valid character; in other words there must not be any blank columns. For alphabetic characters, a blank column is a valid indication as distinguished from numeric.

In storing a group of characters on a magnetic drum from alphanumeric cards which are those containing characters other than numeric, a decimal representation of two digits is made indicative of the particular character recorded. The tens digit is a designation of the group within which it belongs, alphabetic, numeric or special, and the units digit is a designation of the particular character. For the translation process, it is necessary that the group designation be determined as the first row of possible hole positions in a card is being read in order to insert the proper tens digit on the rotating drum. As will be pointed out hereinafter, a hole in a given column in row 12 may be translated into a tens digit, one (1), two (2) or six (6), in accordance with whether it is a special character for the first two or an alphabetic character for the latter. In order to make the correct translation for the character being read, it is necessary to know in advance what this character is, and this is accomplished by reading the card twice.

In prior known machines of this type as shown in the patent to C. B. Smith, Patent No. 2,798,554, there are contained two reading stations for the cards to be sensed where the first station determines the type of character present in the card by two series of relays which are picked for zone rows 12, 11, 0 and for numeric rows 1–9. In the apparatus of Smith, the zone and digit relays in the first sensing station operate contact points which complete circuits from the brushes of the second sensing station to provide for the correct recording of the translated character onto the magnetic storage medium. The storage medium is divided into sectors, with each sector containing ten words of information with twelve digits in each word. The twelve digits are characterized as $D_x$, $D_0$, $D_1$–$D_{10}$ where $D_x$ is used for switching and $D_0$ is used for sign. Digit places $D_1$–$D_{10}$ are utilized individually if the information is totally numeric but are divided into pairs if the information to be stored is alphanumeric. The digit places $D_2$, $D_4$ . . . $D_{10}$ are referred to as zone places while $D_1$, $D_3$ . . . $D_9$ are referred to as numerical places. Therefore, at the second reading station and prior to reading any rows of data, circuitry is completed to insert the proper digital representation into the digit places $D_2$, $D_4$ . . . etc., for blank columns and numeric. At the zone rows 12, 11 and 0, the alphabetic designations contained in the card are filled in at the other remaining digit places $D_2$, $D_4$, etc. When the numeric rows are sensed, information is read directly from the brushes of the second station into the distributor.

The present invention illustrates apparatus for reading cards twice but utilizes a dynamic method of classification in place of a static storage and relay network. With this method of reading information, the rate of information flow into the apparatus is not limited by any consideration aside from the feeding and sensing of the cards. With the advent of higher card feed speeds and improved sensing techniques, high speed apparatus for transferring data between cards and a rotating magnetic drum become necessary.

It is therefore an object of the present invention to provide an improved high speed character classification apparatus for reading data contained in columns and rows and classifying the data for translation into a particular code designation in accordance with said data.

It is a further object of this invention to provide a character classification apparatus for reading data contained in columns and rows for translation into a particular code designation in accordance with said data wherein the rate of character classification is substantially increased.

Another object of this invention is to provide an apparatus for reading data represented by combinatorial row indications and translating this data into a particular code designation in accordance with the presence and absence of selected groups of row indications.

A further object of this invention is to provide an apparatus for reading data contained in individual columns of a record card as combinatorial row indications and translating this data into a particular code designation by sensing and classifying the data at a first point to obtain classification data for transmission to a second point for selecting a particular code designation for said data being sensed at said second station.

Other objects of the invention will be pointed out in the following description and claims and illustrated in the accompanying drawings, which disclose, by way of examples, the principle of the invention and the best mode, which has been contemplated, of applying that principle.

Figure 1:
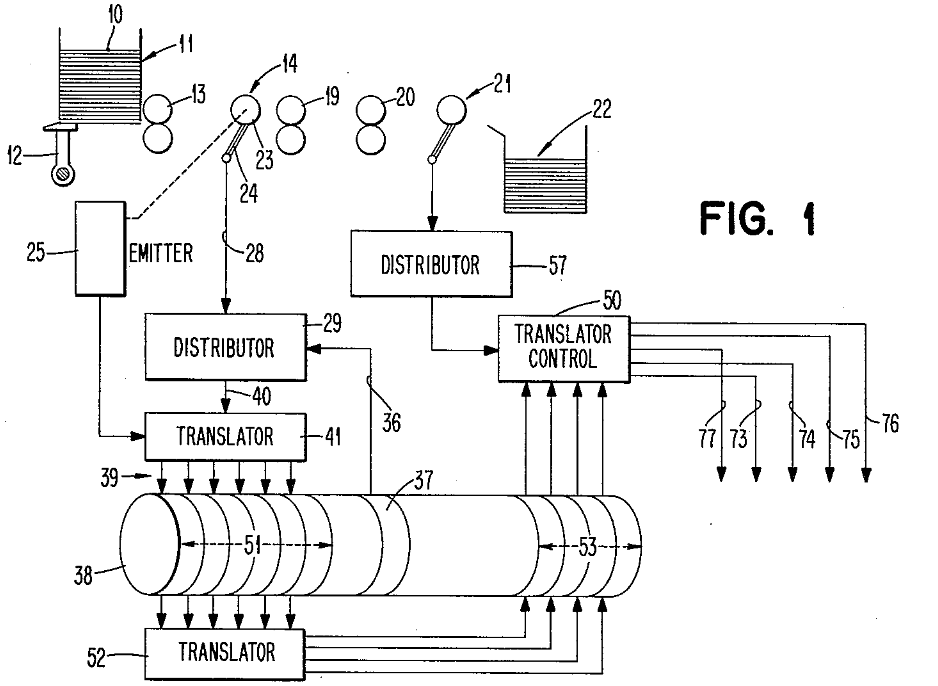
FIG. 1 is a schematic illustration of the invention.

Referring to FIG. 1, cards 10 are to be read and the character contained in each column is to be translated into a two digit number indicative of the character. This is accomplished by reading each individual column of data contained on the card at a first station 14 and translating the data contained as punched holes in the various rows of the card into a presense code stored in tracks 51 which is related to the presence of a hole in a single row or group of rows. After the complete card has been sensed and the presense code for each column of data on the card stored on drum 51, the presense code of tracks 51 is scooted through a translator 52 to a series of tracks 53. The translator 52 converts the presense code into a classification code which indicates how the data sensed in each column is to be translated. As the information on the same card is being read at a second sensing station 21, the data on drum tracks 53 is utilized to switch the information to the proper connecting line 73–77 for a correct translation.

A plurality of cards 10, FIG. 1, are contained in a hopper 11 where they are fed successively from the bottom by a picker knife 12 to feed rolls 13. The feed rolls 13 move the cards 10 through a sensing station 14 where the holes in the individual columns are sensed successively by row. The sensing station 14 consists essentially of a conducting contact roll 23 to which voltage is applied when the card is present thereunder and a plurality of brushes 24, one for each card column, so that each time a hole is sensed a circuit is completed from the contact roll 23 to the particular brush which has sensed the hole. The line 28 represents the total number of lines from the individual brushes of which there may be eighty and which are connected to a distributor 29. Mechanically connected to the contact roll 23 is an emitter 25 which is a commutator having a plurality of output lines sequentially energized in accordance with the card row then present beneath the contact roll and being sensed by brushes 24. This device, of conventional design as shown in the patent to Smith, coordinates the sensing of a punched hole by the completion of a circuit from a brush 24 with the particular row location then being sensed.

The distributor 29 is a rectangular matrix of tubes or other suitable components for transferring the information contained in each particular column of the card to a particular data location on the drum. As shown, circuits 36 from the timing tracks 37 of a magnetic drum 38 are used to generate pulses indicative of the digit position then present under a series of recording heads 39. The pulse generated is applied to the particular coincidence tube or gating component to which a brush connection 28 is also applied. Each tube in the matrix is therefore related to a particular card column and a particular digit position on the drum. When a hole is detected in a particular column and the data is to be placed in a digit position then present under the heads 39, the particular coincidence tube conducts and furnishes a pulse to output circuit 40. This apparatus is shown in the patent to Smith.

Figure 2:
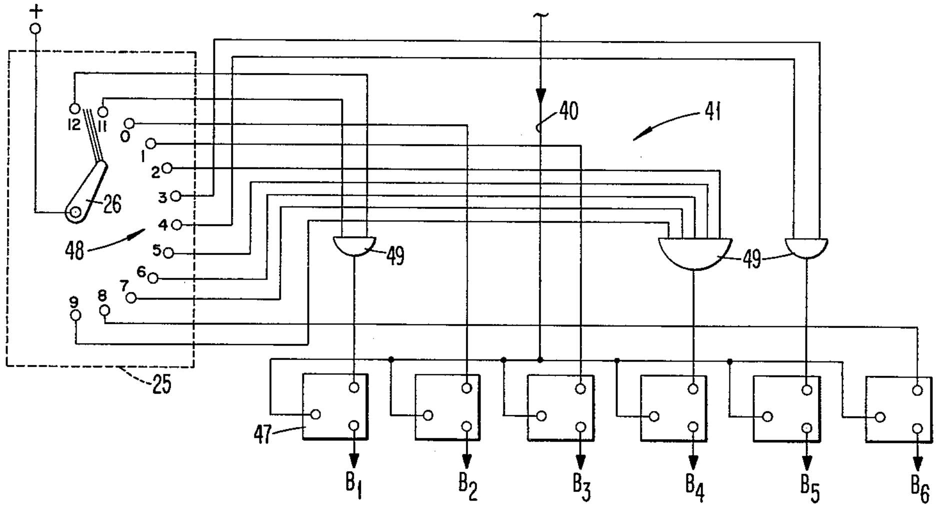
FIG. 2 is the circuit diagram for the emitter and one translator of FIG. 1.

A circuit 41, FIG. 2, utilizes the occurrence of a pulse on output 40 and the output 27 from emitter 25 to generate pulses $B_1$, $B_2$, $B_3$, $B_4$, $B_5$, $B_6$, in accordance with the following:

| Rows | Presense Coded Representation | Bit Positions |
|---|---|---|
| 12 or 11 | X00000 | $B_1$ |
| 0 | 0X0000 | $B_2$ |
| 1 | 00X000 | $B_3$ |
| 2, 5, 6, 7, 9 | 000X00 | $B_4$ |
| 3, 4 | 0000X0 | $B_5$ |
| 8 | 00000X | $B_6$ |

The various combinations of rows will effect a combination of the coded representations which have been identified in short notation as $B_1$–$B_6$ so that when stored on the drum in final form a digit position of six possible bit positions may contain a number of bits, up to three. With the possible number of data characters on a card 11 being a maximum of 80 with 6 bit positions for each character it can be seen that 480 bit positions must be provided for the output of translator 41.

The emitter 25, FIG. 2, contains a commutator 26 movable to successive contact points 12–9 in accordance with the card row then being sensed. A plurality of cathode follower switches 47 have their grids connected to the output 40 and are therefore pulsed once for each column of information in which there is a hole for the row being sensed. Connected to the plate of each cathode follower switch is one or more of the outputs from emitter 25 in accordance with the translation listed above. Conventional OR circuits are utilized to connect the emitter output into a single cathode follower switch 47. When a pulse occurs on output 40 and on an output from emitter 25, the associated cathode follower will conduct and an output pulse will be generated.

The output of each cathode follower switch 47, $B_1$–$B_6$, is coupled to the recording heads 39 by appropriate circuitry such as shown in the patent to Smith mentioned above. The information from a complete card is stored on the drum 38 and the card is then passed through feed rolls 19 and 20 to the sensing station 21. At this point, the information on the card is again read in the same manner as recited above and the individual pulses representative of the data are connected to a translator control circuit 50.

Figure 3:
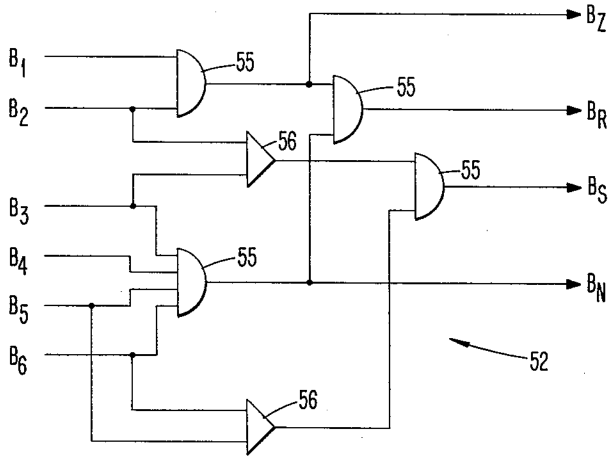
FIG. 3 is the circuit diagram of another translator of FIG. 1.

While the card is being moved from sensing station 14 to sensing station 21, the information contained in the six bit positions $B_1$–$B_6$ on the tracks 51 is transferred to a series of tracks 53 through a translator 52, FIG. 3, by conventional circuitry. This transfer of information is used in order to be able to use tracks 51 for the next card without waiting for the termination of sensing at station 21, in order to allow for simultaneous sensing. The output of translator 52 includes 4 bit positions to be recorded on tracks 53. With the number of possible characters being 80, it can be seen that a total of 320 bit positions must be provided in tracks 53.

The translator 52, FIG. 3, is used to convert the representation contained on drum tracks 51 into a classification code utilized to determine the exact nature of the character recorded and how it is to be translated to data on drum 38. The translator 52 is constructed to recognize the bits in bit positions $B_1$–$B_6$ as falling into separate categories in accordance with the following translation of presense to classification code.

| Presense Code | | Classification | Card Rows |
|---|---|---|---|
| $B_3$ or $B_4$ or $B_5$ or $B_6$ | = | $B_N$ | 1 or 2 or 3, etc., to 9 |
| $B_1$ or $B_2$ | = | $B_Z$ | 12 or 11 or 0 |
| ($B_2$ and $B_3$) or ($B_5$ and $B_6$) | = | $B_S$ | (0 and 1) or [(3 or 4) and 8] |
| $B_1$ or $B_2$ or $B_3$ or $B_4$ or $B_5$ or $B_6$ | = | $B_R$ | Any |

The complete conversion as accomplished so far is indicated in the following table:

| Card Punches In Rows | Symbol | Presense Code | | | | | | Classification Code | | | | Numeric Code |
|---|---|---|---|---|---|---|---|---|---|---|---|---|
| | | $B_1$ | $B_2$ | $B_3$ | $B_4$ | $B_5$ | $B_6$ | $B_N$ | $B_Z$ | $B_S$ | $B_R$ | |
| Bl. Col | – | – | – | – | – | – | – | – | – | – | – | 00 |
| 12-3-8 | . | X | – | – | – | X | X | X | X | X | X | 18 |
| 12-4-8 | Δ | X | – | – | – | X | X | X | X | X | X | 19 |
| 12 | + | X | – | – | – | – | – | – | X | – | X | 20 |
| 11-3-8 | $ | X | – | – | – | X | X | X | X | X | X | 28 |
| 11-4-8 | * | X | – | – | – | X | X | X | X | X | X | 29 |
| 11 | Σ | X | – | – | – | – | – | – | X | – | X | 30 |
| 0-1 | / | – | X | X | – | – | – | X | X | X | X | 31 |
| 0-3-8 | , | – | X | – | – | X | X | X | X | X | X | 38 |
| 0-4-8 | : | – | X | – | – | X | X | X | X | X | X | 39 |
| 3-8 | π | – | – | – | – | X | X | X | – | X | X | 48 |
| 4-8 | = | – | – | – | – | X | X | X | – | X | X | 49 |
| 12-1 | A | X | – | X | – | – | – | X | X | – | X | 61 |

| Card Punches In Rows | Symbol | Presense Code | | | | | | Classification Code | | | | Numeric Code |
|---|---|---|---|---|---|---|---|---|---|---|---|---|
| | | $B_1$ | $B_2$ | $B_3$ | $B_4$ | $B_5$ | $B_6$ | $B_N$ | $B_Z$ | $B_S$ | $B_R$ | |
| 12-2 | B | X | - | - | X | - | - | X | X | - | X | 62 |
| 12-3 | C | X | - | - | - | X | - | X | X | - | X | 63 |
| 12-4 | D | X | - | - | - | X | - | X | X | - | X | 64 |
| 12-5 | E | X | - | - | X | - | - | X | X | - | X | 65 |
| 12-6 | F | X | - | - | X | - | - | X | X | - | X | 66 |
| 12-7 | G | X | - | - | X | - | - | X | X | - | X | 67 |
| 12-8 | H | X | - | - | - | - | X | X | X | - | X | 68 |
| 12-9 | I | X | - | - | X | - | - | X | X | - | X | 69 |
| 11-1 | J | X | - | X | - | - | - | X | X | - | X | 71 |
| 11-2 | K | X | - | - | X | - | - | X | X | - | X | 72 |
| 11-3 | L | X | - | - | - | X | - | X | X | - | X | 73 |
| 11-4 | M | X | - | - | - | X | - | X | X | - | X | 74 |
| 11-5 | N | X | - | - | X | - | - | X | X | - | X | 75 |
| 11-6 | O | X | - | - | X | - | - | X | X | - | X | 76 |
| 11-7 | P | X | - | - | X | - | - | X | X | - | X | 77 |
| 11-8 | Q | X | - | - | - | - | X | X | X | - | X | 78 |
| 11-9 | R | X | - | - | X | - | - | X | X | - | X | 79 |
| 0-2 | S | - | X | - | X | - | - | X | X | - | X | 82 |
| 0-3 | T | - | X | - | - | X | - | X | X | - | X | 83 |
| 0-4 | U | - | X | - | - | X | - | X | X | - | X | 84 |
| 0-5 | V | - | X | - | X | - | - | X | X | - | X | 85 |
| 0-6 | W | - | X | - | X | - | - | X | X | - | X | 86 |
| 0-7 | X | - | X | - | X | - | - | X | X | - | X | 87 |
| 0-8 | Y | - | X | - | - | - | X | X | X | - | X | 88 |
| 0-9 | Z | - | X | - | X | - | - | X | X | - | X | 89 |
| 0 | Ø | - | X | - | - | - | - | - | X | - | X | 90 |
| 1 | 1 | - | - | X | - | - | - | X | - | - | X | 91 |
| 2 | 2 | - | - | - | X | - | - | X | - | - | X | 92 |
| 3 | 3 | - | - | - | - | X | - | X | - | - | X | 93 |
| 4 | 4 | - | - | - | - | X | - | X | - | - | X | 94 |
| 5 | 5 | - | - | - | X | - | - | X | - | - | X | 95 |
| 6 | 6 | - | - | - | X | - | - | X | - | - | X | 96 |
| 7 | 7 | - | - | - | X | - | - | X | - | - | X | 97 |
| 8 | 8 | - | - | - | - | - | X | X | - | - | X | 98 |
| 9 | 9 | - | - | - | X | - | - | X | - | - | X | 99 |

The presense code represented by possible bit positions $B_1$–$B_6$ are converted into the classification code mentioned above by the circuit of FIG. 3 and in accordance with the translation outline of presense to classification code mentioned prior to this. With an input pulse $B_1$ or $B_2$, the OR circuit 55 connected thereto will furnish an output pulse $B_Z$. With an input pulse $B_3$ or $B_4$ or $B_5$ or $B_6$, the OR circuit 55 connected thereto will furnish an output pulse $B_N$. The output pulse $B_R$ is obtained from an OR circuit 55 responsive to an output pulse $B_Z$ or $B_N$. An input pulse $B_2$ and $B_3$ at AND circuit 56 will cause an output $B_S$ as will inputs $B_5$ and $B_6$ to their associated AND circuit 56.

While the card is being read at the second read station 21 and in timed relation with the scan of sequential card columns, the data from tracks 53 representing these same card columns is applied to a translator control 50 which gates the timed pulse to one of five outputs 73–77 in accordance with whether the character is to be translated as blank, special 1, special 2, numeric or alphabetic. The output pulse on one of outputs 73–77 is connected to a particular translator (not shown) for translating the pulse from reading station 21 into a decimal representation. As an example of this procedure, the table reproduced above shows that each individual character is translated into a two digit decimal number. The circuit of FIG. 2 illustrates the manner in which a conversion is effected by use of an emitter. For use in the second read station, however, the connections would be different and more involved since the tens and units digit are recorded in sequential digit places. For detailed circuitry and description of this type of translation, reference may be made to the patent to Smith mentioned above. Furthermore, the timing of the various circuits has not been shown since it is conventional and forms no part of the present invention.

In the conversion table reproduced above, it is seen that for a blank column the numeric code is 00 which would be translated by a special circuit. The special characters "E" and "Σ" are translated in a special emitter circuit, for example, as well as numeric "0"; these pulses are applied to the output labeled Special 1. All special characters having two or more punches per column are applied to the output labeled Special 2, for translation. Alphabetic and numeric characters are also separated into different outputs for translation.

Figure 4:
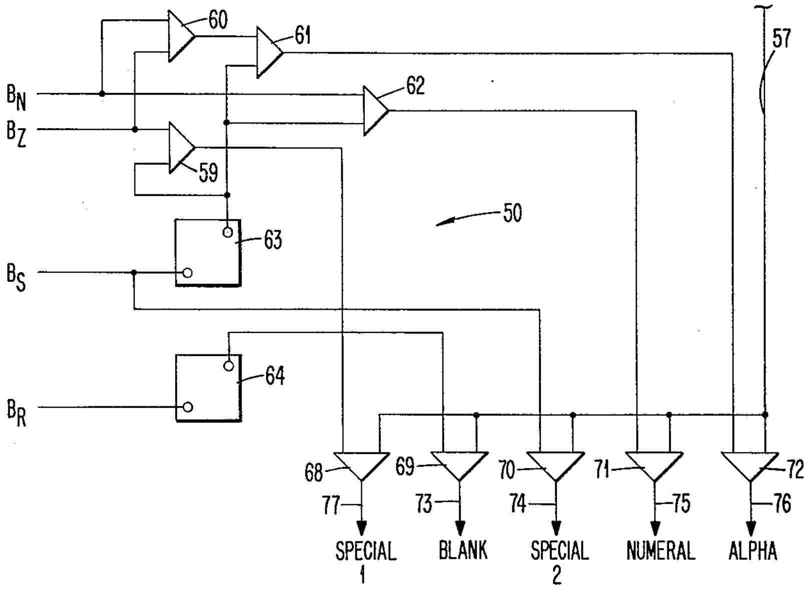
FIG. 4 is the circuit diagram of the translator control of FIG. 1.

The translation control circuit 50, FIG. 4, recognizes the type of character from sensing station 21 and distributor 57 by means of input pulses $B_N$, $B_Z$, $B_S$ and $B_R$ in the following manner:

(1) When there is a $B_N$ and a $B_Z$ signal and no $B_S$ signal, the character is to be translated in the alphabetic translator.

(2) When there is a $B_N$ and no $B_S$, the character is to be translated in the numeric translator.

(3) When there is a $B_Z$ and no $B_S$, the character is to be translated in the Special 1 translator.

(4) When there is a $B_S$, the character is to be translated in the Special 2 translator.

(5) When there is no $B_R$, the character is to be translated as a blank.

Circuits 59–62 and 68–72 are AND circuits and provide a raised output when all inputs are at a raised level. Circuits 63 and 64 are simple inverters and provide a raised output when there is no input so that they are indicative of a negative quality which in this case is not $B_S$ and not $B_R$. Input pulses $B_N$ and $B_Z$ applied to AND 60 will raise the input to AND 61 so that with no $B_S$ the AND 61 will condition AND 72 for a pulse from input 57. In a similar manner, $B_N$ and no $B_S$, from inverter 63, will condition AND 62 to condition AND 71. An input $B_S$ conditions AND 70. No $B_R$ conditions AND 61. $B_Z$ and no $B_S$, from inverter 63, raises the output of AND 59 to condition AND 68.

With the pulses from the distributor 57 separated out by translator control 50 into five different translation categories 73–77, the particular decimal code may be assigned in accordance with the particular row then being sensed. In translating, it would, of course, be necessary to know the row then being sensed which could be an arrangement such as shown with respect to sensing station 14 or any other suitable apparatus.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an apparatus for reading records wherein data is stored by combinatorial row indications to indicate a character of data, each said character being classifiable as numeric; alphabetic or special in accordance with the total combination of row indications, first means for successively reading the rows of said record, translator means responsive to row indications for providing an output indicative of the row then being sensed, means for storing the output for each character, second means for successively reading the rows of said record and providing an output, switching means connected to said second reading means, said switching means having a plurality of selectively operable outputs to each of which the output from said second reading means is applied, and gating means included in said switching means and responsive to the stored output for each character for operating one of said selectively operable outputs whereby each row indication read by said second reading means is separated to a selected output as a function of the character previously read.

2. In an apparatus for reading record cards wherein data is stored by combinatorial row indications to indicate a character of data, said record being divided into a zone portion including a plurality of rows and a numeric portion including a plurality of rows wherein, an alphabetic character is represented by a row indication in a zone portion and a numeric portion; a numeric character is represented by a row indication in a numeric portion only; and special characters are represented by other combinations of row indications; a first means for successively reading the rows of said record card, translator means responsive to said row indications, said translator including means responsive to the row then being read for separating each row indication into one of a plurality of outputs, each output being representative of at least one row indication unique to the representation of a given class of character, means for recording the output of said translator, second means for successively reading the rows of said record and providing an output, switching means connected to said second reading means, said switching means having a plurality of selectively operable outputs to each of which the output from said second reading means is applied, and gating means included in said switching means and responsive to the stored output for each character for operating one of said selectively operable outputs whereby each row indication read by said second reading means is separated to a selected output as a function of the character previously read.

3. In an apparatus for reading record cards wherein data is stored by combinatorial row indications to indicate a character of data and each character is contained in a separate column of said record, said record being divided into a zone portion including a plurality of rows and a numeric portion including a plurality of rows wherein, an alphabetic character is represented by a row indication in a zone portion and a numeric portion; a numeric character is represented by a row indication in a numeric portion only; and special characters are represented by other combinations of row indications; a first means for successively sensing the rows of each record's cards column, said first means including a distributor responsive to a row indication for any column of data to provide an output at a unique time with respect to all other columns, translator means responsive to said row indications, said translating including means responsive to a row then being read for separating each row indication into one of a plurality of outputs, each said output being representative of at least one row indication unique to the representation of a given class of character, rotatable storage means operable to receive the output of said translator and having a series of discrete storage positions for the output of a translator, means for synchronizing the rotation of the storage means with the reading of each column of data from the record card whereby each character of data is recorded at a unique time on said rotatable storage means, second means for successively reading the rows of said record column, said second sensing means including distributor means responsive to a row indication for each column of data to provide an output at a unique time with respect to all other columns, means for reading the output recorded on said rotatable storage means at a time coincident with the reading of the same character from said record cards by said second sensing means, switching means connected to the output of the distributor of said second sensing means, said switching means having a plurality of selectively operable outputs to each of which the output from said distributor of said second sensing means is applied, and gating means included in said switching means and responsive to the stored output for each character for operating one of said selectively operable outputs whereby each row indication read by said second sensing means is separated to a selected output as a function of the character as previously stored on said rotatable storage means.

4. The apparatus of the previous claim including translator means in the readout circuits from said rotatable storage means responsive to the coded output of said first translator for providing an output to said switching means indicative of whether the character read by said first sensing means contains a numeric portion, a zone portion, or as indicated therein a special character whereby information from said second sensing means may be routed in accordance with these designations.

No references cited.